United States Patent
Crisp et al.

(10) Patent No.: US 10,917,134 B2
(45) Date of Patent: Feb. 9, 2021

(54) RFID SYSTEMS

(71) Applicant: Cambridge Enterprise Limited, Cambridge (GB)

(72) Inventors: Michael Crisp, Cambridgeshire (GB); Ian H. White, Cambridgeshire (GB); Richard Penty, Cambridgeshire (GB); Zhe Fu, Cambridgeshire (GB); Sithamparanathan Sabesan, Middlesex (GB)

(73) Assignee: CAMBRIDGE ENTERPRISE LIMITED

( * ) Notice: Subject to any disclaimer, the term of this patent is extended or adjusted under 35 U.S.C. 154(b) by 0 days.

(21) Appl. No.: 16/648,108

(22) PCT Filed: Sep. 18, 2018

(86) PCT No.: PCT/GB2018/052661
§ 371 (c)(1),
(2) Date: Mar. 17, 2020

(87) PCT Pub. No.: WO2019/053475
PCT Pub. Date: Mar. 21, 2019

(65) Prior Publication Data
US 2020/0259520 A1  Aug. 13, 2020

(30) Foreign Application Priority Data
Sep. 18, 2017 (GB) .................................. 1714992.3

(51) Int. Cl.
*H04B 1/713* (2011.01)
*G06K 7/10* (2006.01)

(52) U.S. Cl.
CPC ......... *H04B 1/713* (2013.01); *G06K 7/10297* (2013.01); *G06K 7/10356* (2013.01); *G06K 7/10475* (2013.01)

(58) Field of Classification Search
CPC .............. H04B 1/713; H04B 10/25756; G06K 7/10019; G06K 7/10267; G06K 7/10346; G06K 7/10356; G06K 7/10297; H04W 88/085; H04Q 1/138; G01N 33/0075; H01Q 1/2216
See application file for complete search history.

(56) References Cited

U.S. PATENT DOCUMENTS

2009/0146792 A1   6/2009   Sadr et al.
2011/0133891 A1*  6/2011   Krug .................. G06K 7/10079
                                                          340/10.1

(Continued)

FOREIGN PATENT DOCUMENTS

| WO | 1998045956 A1 | 10/1998 |
| WO | 2000052498 A1 | 9/2000 |
| WO | 2017072601 A1 | 5/2017 |

*Primary Examiner* — Khanh C Tran
(74) *Attorney, Agent, or Firm* — Tarolli, Sundheim, Covell & Tummino LLP

(57) ABSTRACT

A system for the distribution of RFID signals to a remote antenna or a remote antenna network comprising: a central control module to generate signals and control the protocol operations; cable, in particular twisted pair cable, connecting the central module to one or more antenna subsystems carrying substantially baseband representations of the reader to tag modulation and tag to reader modulation.

17 Claims, 14 Drawing Sheets

(56) References Cited

U.S. PATENT DOCUMENTS

| | | | |
|---|---|---|---|
| 2013/0201003 A1* | 8/2013 | Sabesan | G01S 13/878 340/10.1 |
| 2013/0234831 A1* | 9/2013 | Sabesan | G06K 7/10019 340/10.2 |
| 2018/0101705 A1* | 4/2018 | Martinez | G06K 7/10356 |
| 2019/0138770 A1* | 5/2019 | Compaijen | G06K 7/10366 |

* cited by examiner

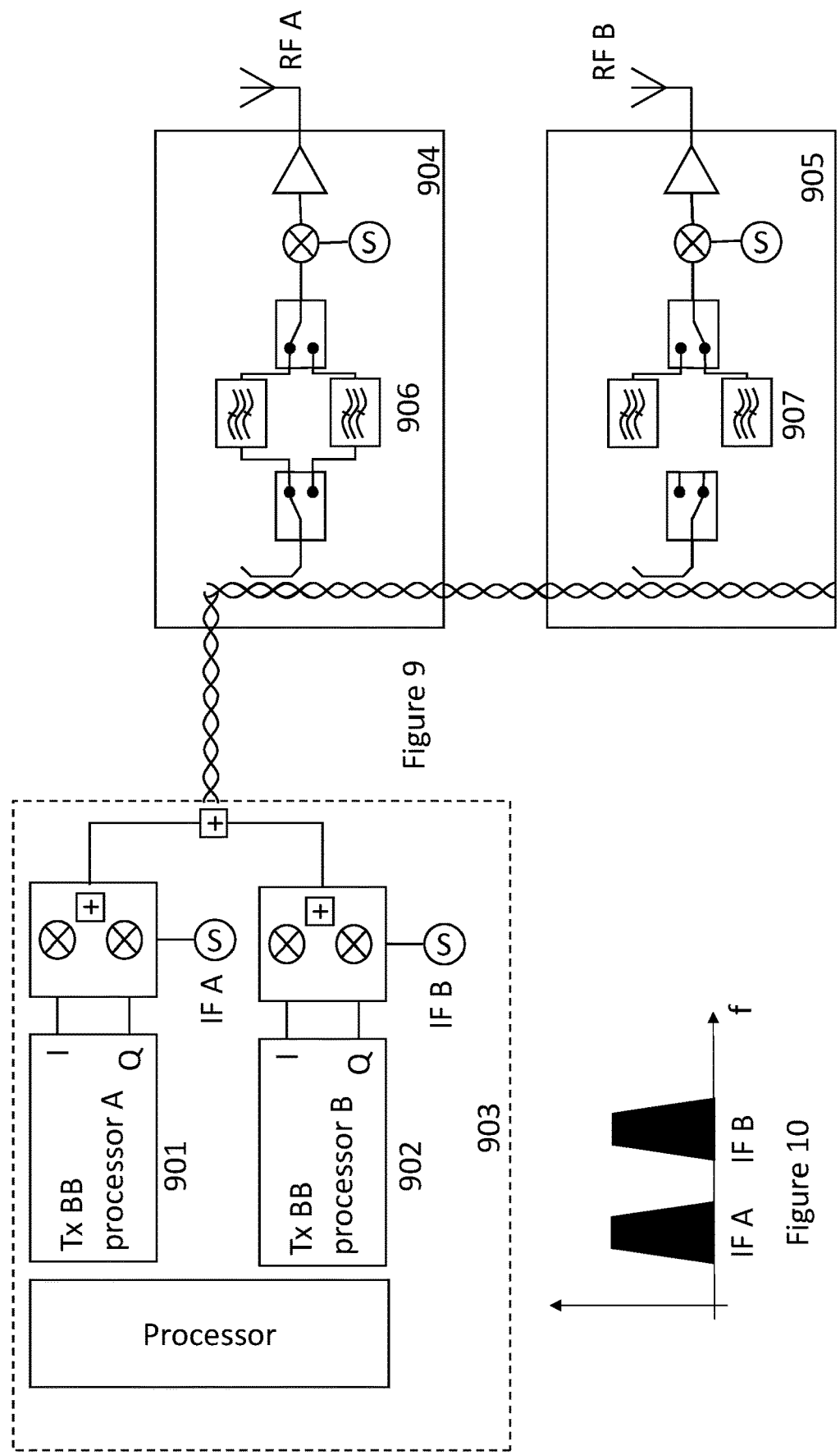

RFID SYSTEMS

RELATED APPLICATIONS

The present invention is a U.S. National Stage under 35 USC 371 patent application, claiming priority to Serial No. PCT/GB2018/052661, filed on 18 Sep. 2018; which claims priority of GB 1714992.3, filed on 18 Sep. 2017, the entirety of both of which are incorporated herein by reference.

FIELD OF THE INVENTION

This invention relates to systems for reading RFID (Radio Frequency Identification) tags, in particular UHF (Ultra High Frequency) RFID tags, where the interrogator has multiple antennas with cable connections between a central controller and each antenna.

BACKGROUND TO THE INVENTION

RFID has become established for a wide range of applications for the detection and identification of items. More recently similar technology is also being applied to wireless sensing. Of particular interest is the ultra-high frequency (UHF) passive RFID system which offers a wireless range of the order of meters with very low cost tags having no internal power source. The lack of power source limits the wireless range between interrogator antennas and tags.

To overcome the limited range, RFID interrogators often use multiple antennas to give a wider area of coverage either through antenna diversity, or by exploiting the coherent power sum of multicast signals. Details can be found, for example in: WO2007/094868, WO2008/118875, WO2008/027650, WO2011/135329 and US 2009/0146792. Further background prior art can be found in WO2011/135328.

As background we describe the normal function of an RFID Interrogator system (as shown in FIG. 3). A computer or microcontroller (not shown) is used to control the operation and log information for the user (normally the information is the timestamp and identity of the tag which has been read). A baseband processor generates the required waveform for communication from the interrogator to the tag and interprets responses from the tag, these waveforms are typical 1 kHz-1 MHz in bandwidth depending on the data rate and modulation format for the tag. A commonly used modulation, coding and protocol is specified by the EPC Class 1 Gen 2 Air Interface Standard. A frontend converts these baseband signals to Radio Frequency (RF) in the downlink and vice a versa in the uplink. The RF carrier has a substantially higher frequency in the UHF band chosen to avoid interference with other services, to conform to regulatory requirements and to allow radiative transmission. The RF carrier frequency may be altered within a set of predefined channels to mitigate the effects of multipath fading and reduce interference. Due to the Ultra High Frequency (UHF) band, the RF frontend is connected to the antennas by some form of a transmission line. In some systems this is a microstrip on a printed circuit board; in other cases a co-axial cable. The attenuation of the transmission line limits the separation between the RF front end and the antenna. A typical limit on the separation for low loss co-axial cables is of the order of 10 metres. Beyond this distance, significantly more power is required in the downlink of the RF front end and uplink sensitivity is degraded due to the increase in Signal to Noise Ratio (SNR) on the cable.

As such the use of UHF transmission over co-axial cable limits the distance between the reader hardware and antennas. An alternative approach is to move the entire reader hardware to the antenna with a standard Ethernet interface to each reader hardware implementation, however standard Ethernet does not readily allow accurate time information transmission so multiple antennas cannot be used in a collaborative manner.

SUMMARY OF THE INVENTION

According to a first aspect of the invention there is provided an RFID tag reading system for reading one or more RFID tags, the system comprising an RFID baseband processor within a central controller, one or more transmit/receive antenna units coupled to said RFID baseband processor, and at least one RFID tag wherein the RFID tag is configured to operate in the UHF band and the communication between the central controller and the transmit/receive antenna units operates at a (substantially) lower frequency, for example a baseband frequency (of the central controller).

Thus, some embodiments overcome limitations of the prior art approaches as described above by transmitting RFID signals at much lower frequency on twisted pair cables (or low cost co-ax) allowing both long transmission distances and alternative network topologies for multiple antennas.

In some embodiments, multiple antenna units are configured to simultaneously transmit and receive signals, for example for locating a tag. In other embodiments the system may also be configured to time division multiplex signals from the antenna units. A distance between the central controller and a transmit/receive antenna unit may be greater than 10 m, 30 m or 100 m.

In some preferred implementations of the system, the RF front end is contained in the antenna units, such that the signals to be carried from the baseband RFID processor within the central controller are at either a low intermediate frequency or as baseband in-phase (I) and quadrature phase (Q) representations. The skilled person will appreciate that this will allow the interconnection of the baseband RFID processor and the antenna units to use transmission line based on twisted-pair cable (or other low cost cable) rather than co-axial cable owing to the lower frequency.

In further embodiments, the connection from the central controller to the antenna units may use various network topologies (at either baseband, Intermediate frequency (IF) or UHF), for example a star topology where each antenna unit has a dedicated connection back to the central controller and/or a daisy chain topology where each antenna unit is connected other antenna units and eventually back to the baseband unit and hybrid combinations of these topologies. In general the topology of connections between the central controller and the antenna units is not limited to a star topology and non-star topologies may be employed. Still further, embodiments of the system facilitate accurate time alignment of the signals at different antenna units, coordinated by the central controller, and thus may facilitate the use of multiple antennas in a collaborative manner, for example where signals from and/or to one antenna unit have a defined phase relationship to signals from and/or to another antenna unit.

In further embodiments, multiple signals (uplink, downlink, control and timing) can be carried on a single transmission line using frequency division multiplexing.

In yet further embodiment, a reference signal is transmitted to the antenna units from the RFID processor to allow coherent phase locked operation of the antenna units, such that the coherent field sum of multiple antennas can be exploited.

In another aspect the invention provides a system for the distribution of RFID signals to a remote antenna or a remote antenna network. The system may comprise a central control module to generate signals and control the protocol operations. The system may further comprise a cable connecting the central module to one or more antenna subsystems carrying substantially baseband representations of reader to tag modulation and tag to reader modulation.

In some implementations, the antenna subsystem performs up-conversion to RF in the downlink and down-conversion from RF to base-band in the uplink. Here, the downlink may comprise a transmit path to the antenna(s)/network; the uplink may comprise a receive path from the antenna(s)/network.

In a related aspect the invention provides a system for the distribution of RFID signals to a remote antenna or a remote antenna network. The system may comprise a central control module to generate signals and control the protocol operations. The system may further comprise a cable connecting the central control module to one or more antenna subsystems carrying one or more IF (intermediate frequency) representations, e.g. substantially low IF representations, of the reader to tag modulation and tag to reader modulation subsystems.

In some implementations of the above described systems the cable may be a twisted pair cable. However the described techniques also work with other types of cable including but not limited to (low cost) coaxial cable.

In some implementations of the above described systems a timing reference signal is transmitted over a pair of the cable, to one or more antenna subsystems to phase lock the frequency conversion oscillators of the system.

In some implementations of the above described systems the antenna subsystem may be powered using DC signals applied to the cable.

In some implementations of the above described systems a reference signal may be transmitted over the cable e.g. twisted pair to maintain coherence between the local oscillators of two or more antenna sub-systems of the system.

In some implementations of the above described systems a separate cable may be used between the central module and each antenna subsystem of the system.

In some implementations of the above described systems multiple antenna subsystems are daisy-chained using a single cable from the central control module.

In some implementations of the above described systems a separate cable may be used between the central module and each antenna subsystem, and where multiple antenna subsystems are daisy-chained from a single cable from the central control module, to link the central control module to the antennas.

In some implementations of the above described systems, where multiple signals having different IF signals are carried on the cable with multiple antenna units, each antenna unit may be configured to select one of the IF signals for transmission by means of a configurable filter.

In broad terms an antenna unit may be a unit or module which connects to an antenna such as a transmit or receive antenna, or antenna network, and sends signals to and/or receives signals from the antenna. The antenna unit may process the signals for transmission and/or reception.

In some implementations of the above described systems the configurable filter is implemented by means of a switched filter bank.

In some implementations of the above described systems the configurable filter is achieved by means of, i.e. is configured to implement, a superheterodyne process.

In some implementations of the above described systems the uplink (tag to reader) signals are carried at a (low) IF frequency, with multiple, i.e. different respective antenna subsystems each utilising a different respective IF frequency to allow separation of the signals from each antenna subsystem at the central controller.

In some implementations of the above described systems the separation of the IF frequencies is chosen such that their separation is equal to the desired RF channel spacing allowing a common RF LO (local oscillator) frequency to be used by some or all antenna units (subsystems) and channel hopping to be achieved by switching of the IF selection filter in the antenna units (subsystems).

In some implementations of the above described systems control of the antenna subsystems is achieved through demodulation of the downlink signal, in particular to allow synchronisation of the antenna subsystem configuration and a downlink protocol. In some implementations of the above described systems multiple antenna subsystems simultaneously select the same IF frequency to form a cell transmitting substantially the same signal over an interrogation area.

In some implementations of the above described systems where the antenna of at least some of the antenna subsystems on a particular IF frequency changes with respect to time to alter the physical location of the cell or interrogation area.

In some implementations of the above described systems separate antenna units may be used for transmit and receive functions. Such and other systems may be configured to transfer a portion of the downlink signal to a signal processing path for the receive antenna unit, in particular for the purpose of cancellation of signal leakage (e.g. from the signal to the transmitter into the receive signal path). Here the downlink may comprise a transmit path to the antenna(s)/network.

BRIEF DESCRIPTION OF THE DRAWINGS

These and other aspects of the invention will now be further described, by way of example only, with reference to the accompanying figures in which:

FIG. 9 shows a daisy chained low IF system having multiple independent baseband processors;

FIG. 10 shows an example of the spectrum of the multiple IF signals carried on the twisted pair for the system shown in FIG. 9;

DETAILED DESCRIPTION OF PREFERRED EMBODIMENTS

Figure 1:
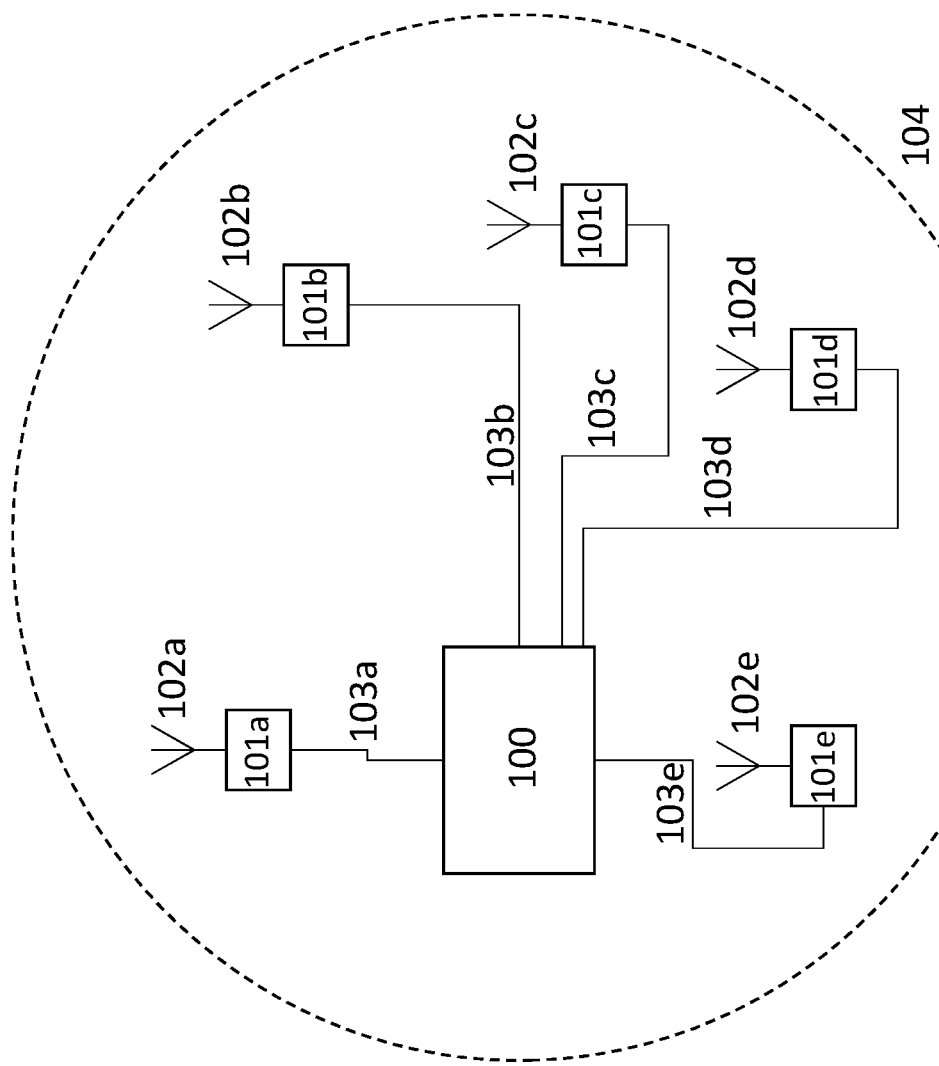
FIG. 1 shows a distributed RFID interrogator system using a star cabling topology.

Referring to FIG. 1, this illustrates an example of a distributed RFID interrogator system implementing a star cabling topology. The distributed RFID interrogator system comprises a central controller 100, multiple antenna units (101{a,b,c,d,e}) to provide coverage to an area 104. Each antenna unit comprises an antenna (102{a,b,c,d,e}).

The central controller unit 100 is connected to each antenna unit with a cable (103{a,b,c,d,e}).

Figure 2:
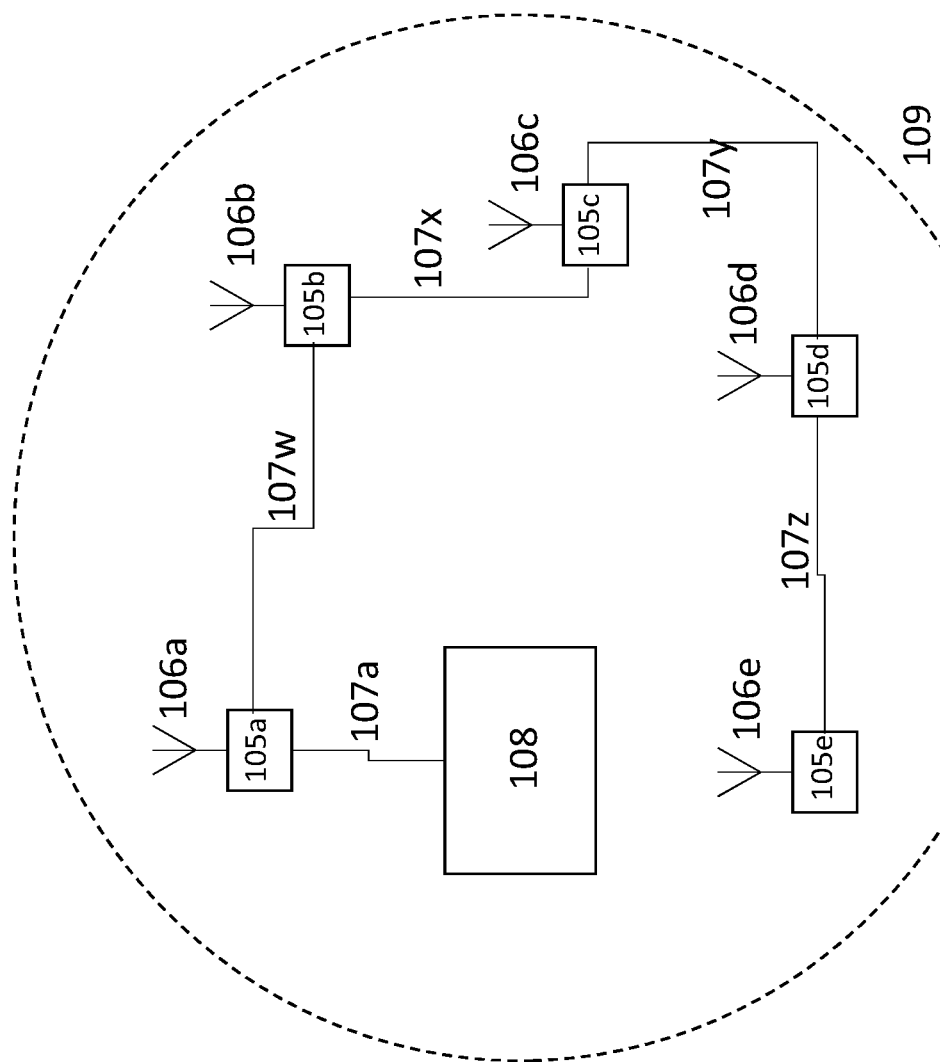
FIG. 2 shows a distributed RFID interrogator system using a daisy chain topology.

Referring to FIG. 2 which shows a distributed RFID interrogator system to provide coverage to an area 109 using a daisy chain topology. The distributed RFID interrogator system comprises a central controller 108 and multiple antenna units (105{a,b,c,d,e}). Each antenna unit comprises an antenna (106{a,b,c,d,e}) with cables (107{a,w,x,y,z}) connecting the antenna units to the central controller 108.

Figure 3:
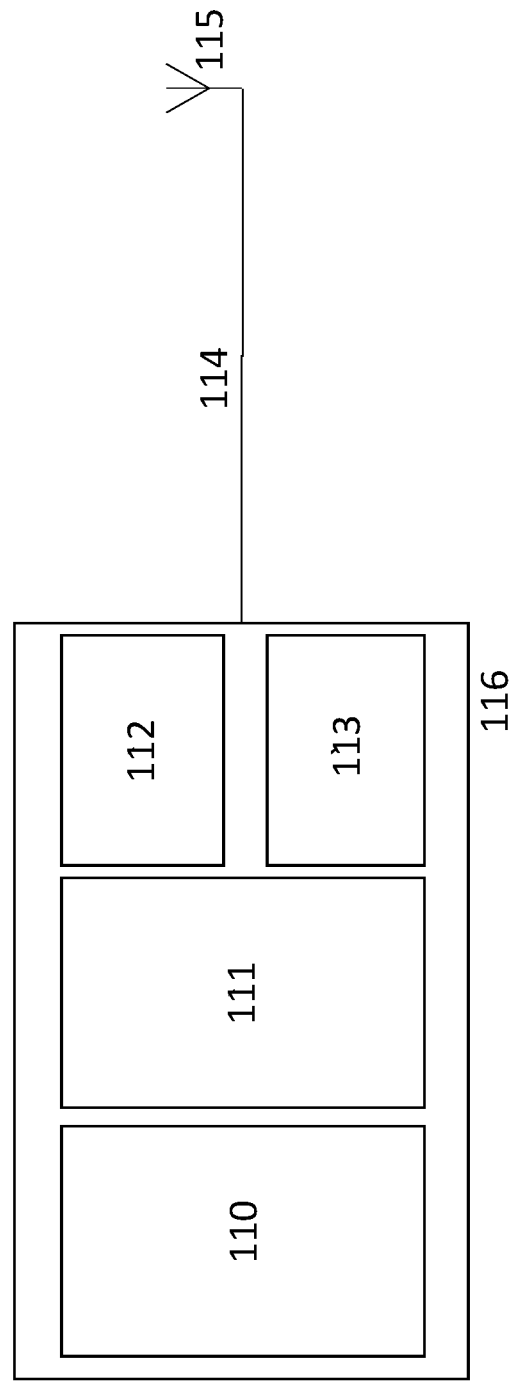
FIG. 3 shows an RFID reader system using coax cable.

FIG. 3 illustrates an example of a RFID system reader 116 comprising a digital baseband unit 110, an analog baseband unit 111, an RF front-end 112 and RF synthesiser 113. The RFID reader system 116 is connected to an antenna 115 by a co-axial cable 114. In such a RFID system, both the baseband unit and radio frequency (RF) unit (consisting of the RF front end and a frequency synthesizer) are integrated on a single PCB (or even IC) to form an RFID reader, and a short coaxial cable 114 connects the reader to its antenna. The cable loss is directly proportional to the cable length and is of the order of dB's per meter at frequencies around 900 MHz. Hence, maximum reader output power and antenna gain limit the maximum allowable cable length if the maximum effective isotropic radiated power (EIRP) allowed by the local regulations is to be reached. For example, for 1 W conducted output power and 6 dBi antenna gain, the maximum allowable cable length is only a few metres. While the maximum cable length in the downlink can be increased by increasing the conducted output power (at the expense of electrical power consumption), in the uplink the cable loss eventually results in a noise limited link and reduced sensitivity.

Twisted-pair cable such as Category 5e (Cat5e) is a potential replacement for coaxial cable due its low cost and ease of deployment but Cat5e cable suffers very high attenuation in carrier frequency band (860-960 MHz). However, this problem may be mitigated by moving some RF units to the antenna side and so only baseband signals need to be communicated over Ethernet cable as shown in FIG. 4.

Figure 4:
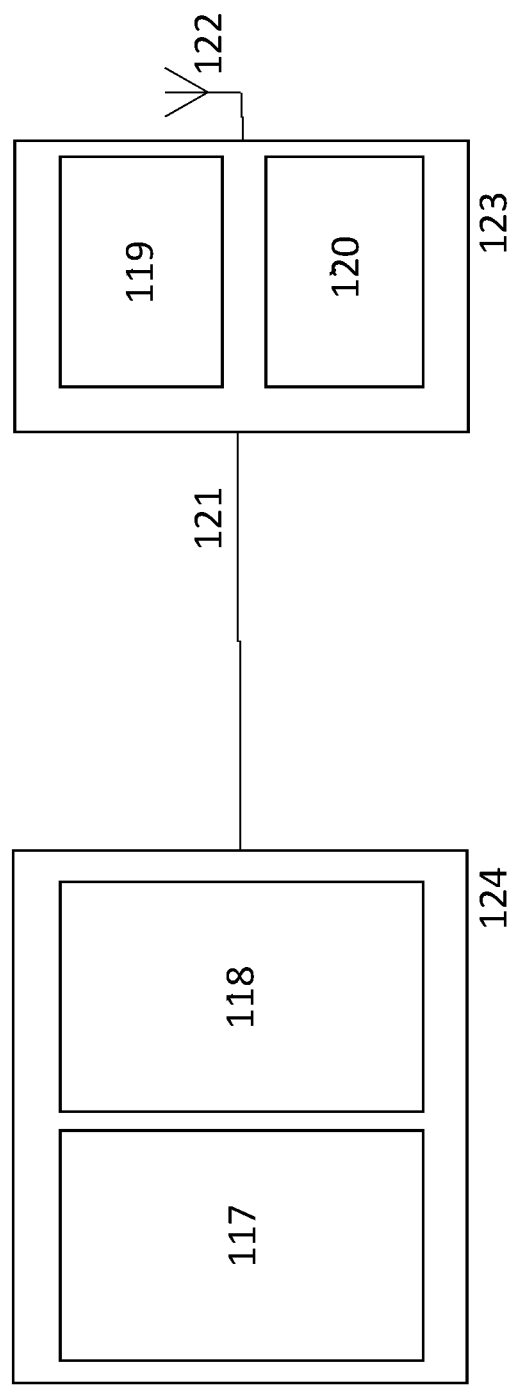
FIG. 4 shows an example of RFID system using twisted pair cable.

FIG. 4 shows an example of RFID system using a twisted pair cable for antenna remoting. The RFID system comprising a central controller 124, a twisted pair cable 121 connected to an antenna unit 123 feeding the antenna 122. The central controller 124 comprises a digital baseband unit 117 and analog baseband unit 118. The antenna unit 123 comprises an RF front end 119 and RF synthesiser 120.

In the forward link, the baseband transmit signals are generated in the digital baseband unit 117 based on local regulations and standards. After digital to analog conversion, the resulting analog baseband signals are transmitted to the remote antenna subsystem 123 over a twisted-pair cable 121. Up-conversion is performed in the RF front end 119. A short coaxial cable can be applied between the antenna and the antenna subsystem depending on requirements of the installation. The backscattered signals, in the reverse link, experience similar processes but in a reverse order. They are received as RF at the antenna, and mixed back to I and Q baseband components in the antenna subsystem before transmission over the two pairs of the Cat5e to the central controller where digitization and protocol operations are executed. The local oscillator for up and down conversion is generated in the antenna sub-system, and a reference tone is carried from the central controller, so multiple antenna subsystems can be potentially phase locked in the future for the coherent systems.

Figure 5:
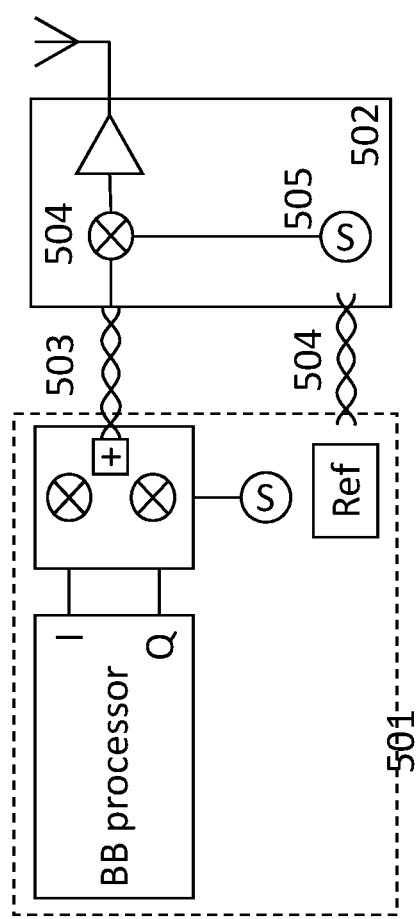
FIG. 5 shows details of the downlink operation for a system using a single twisted pair.

Referring to FIG. 5 which shows details of the downlink operation for a system using a low IF frequency and a single twisted pair 503 connecting a central controller 501 and the antenna unit 502. An additional twisted pair is used to carry a reference signal 504 to lock the UHF local oscillator 505 in the antenna unit.

Figure 6:
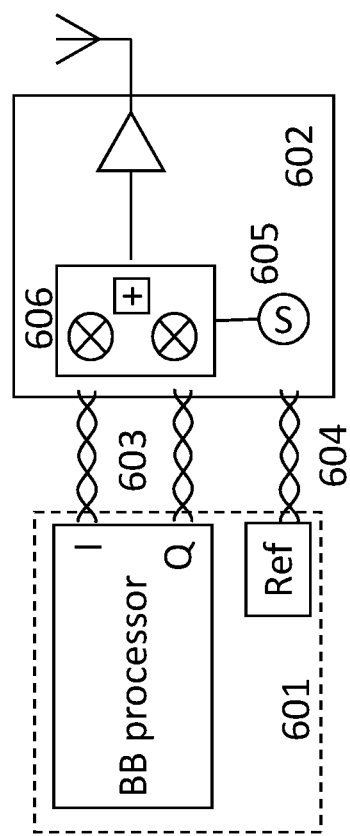
FIG. 6 shows details of the downlink operation of a system using two twisted pair cables.

In FIG. 6 the downlink operation of a system using a baseband IQ transmission of the downlink signals from the central controller 601 using two twisted pair cables 603 to the remote antenna unit 602. An additional twisted pair is used to carry a reference signal 604 to lock the UHF oscillator 605.

One implementation showing only a single antenna unit (of which a practical system will have many) is shown in FIG. 6 (downlink). A central controller 601 comprises a processor to implement protocol operations (not shown) and a RFID Baseband processor to generate modulated signals in a downlink, and demodulate the signals in an uplink. Since in the uplink and the downlink modulation of both the amplitude and phase can be carried out, both inphase (I) and quadrature (Q) components are required to fully represent the signal in the baseband.

Figure 8:
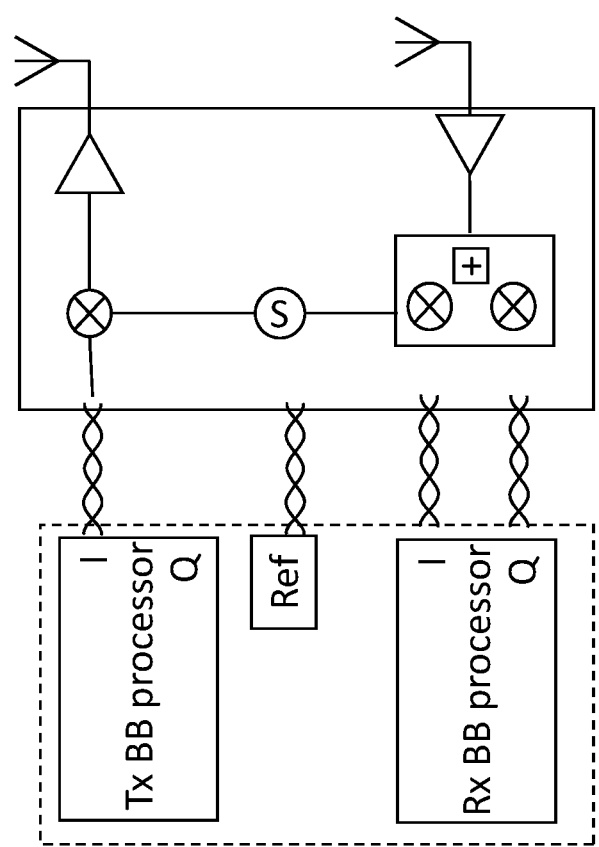
FIG. 8 shows a full implementation of the uplink and downlink signal paths in a baseband system using only amplitude modulation.

In the downlink the I and Q baseband signals can be carried directly over low bandwidth cable such as Cat-5 twisted pair thin Ethernet cable 603 with each of the I and Q occupying one pair of the multi-pair cable. If only amplitude modulation is employed (as shown in FIG. 8), one of the I and Q contains no information and only one signal is transmitted on a single pair to convey the full information.

At the antenna unit 602, the downlink reader signals are applied to a quadrature modulator 606 for direct conversion to RF frequency using a local oscillator 605, and amplified and filtered before transmission from the antenna. The modulator, amplifiers and filters form the RF front end.

In an uplink (FIG. 8), responses from the tags in the UHF band are received by an antenna, and amplified by a low noise amplifier before downconverting to a much lower frequency. Alternatively, this can be done by direct conversion or with intermediate frequency steps. The local oscillator may be shared with the uplink, or could be an independent oscillator. Sharing local oscillator with the uplink has been shown to reduce the effect of phase noise leakage between the downlink and uplink signal paths. Since, the phase of the returned signal is not known with respect to the phase of the local oscillator, both the I and Q baseband signals are required to represent the tag response with the maximum signal to noise ratio.

The resulting I and Q baseband signals are then carried over pairs of the twisted pair cable to the RFID baseband processor. The complete central processor and single antenna unit is shown in FIG. 8.

Figure 7:
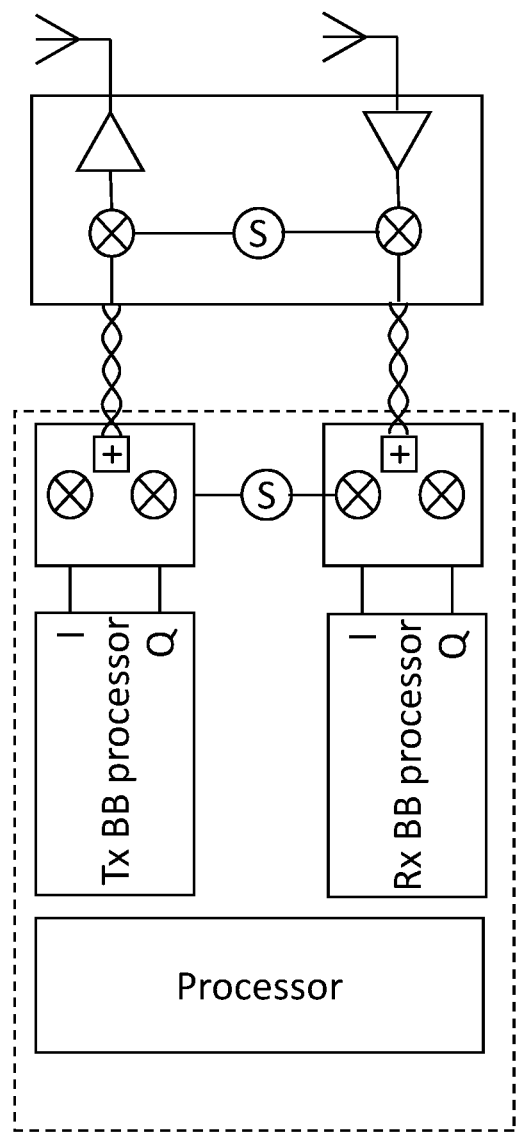
FIG. 7 shows a full implementation of an uplink and downlink signal paths in a low IF system, sharing the IF and UHF oscillators between the uplink and downlink.

In an alternative embodiment, the uplink and downlink signals are carried at a low IF frequency on the cat-5 cabling rather than the base band as shown in FIG. 5. In such a case the RFID baseband processor generates the baseband signals which are then mixed up in the downlink to the low IF either by software (before digital to analog conversion) or in hardware (after digital to analog conversion). The approach has the advantage that the full complex signal can be represented on a single twisted pair, thus more pairs in a standard cable (e.g. Cat-5) are available for other functions. In the antenna unit, where a quadrature modulator 606 was used for the baseband signals, only a single mixer or upconverter is required 504. In this case the local oscillator 505 is set to the desired RF frequency plus or minus the Intermediate Frequency, an image rejection filter then removes the unwanted side band. In the uplink (not shown), again at the antenna unit, only a single mixer is required for frequency conversion and the resulting IF can be carried on a single twisted pair cable. At the central controller, the IF signals can be converted to baseband before processing by the RFID baseband processor, or they can be directly digitised and digitally down converted before processing. This arrangement is shown in FIG. 7. (An optional reference signal locking the UHF oscillator is not shown.) The local oscillator for frequency conversion is derived from a frequency synthesiser which may be free running or may use a reference signal also transmitted over the twisted pair cable (504, 604), at for example, 10 MHz. A person skilled in the art will appreciate that such a signal can be transmitted on a single pair alone, or it can be multiplexed with other signals having a different frequencies. It will also be appreciated that several topologies for the quadrature modulator could be applied, either using direct up conversion or a superhetrodyne architecture with one or more intermediate frequency steps. The frequency of the local oscillator (or oscillators) should preferably be controllable and tuneable to allow frequency hopping of the resulting RF signal.

Power for the remote antenna unit may be provided directly by a separate cable or may be carried as a DC or AC signal along with the data. Additional control signals may also be carried on the twisted pair cable for example to configure the local oscillator frequency, turn on or off the antenna unit RF output, in some embodiments select the IF band in use, or configure which antenna units operate as an uplink, downlink or bi-directionally.

In some implementations the system may have a large number of antenna units (for example 10 or 100) connected to one or more central controllers each containing one or more baseband processor units. The system may be configured to operate one or more antenna units simultaneously with the same or different modulations and RF frequencies. The uplink and downlink have a number of potential methods of operation with either each antenna unit operating simultaneously both an uplink and a downlink, or with separate antenna units performing the uplink and downlink functions. The antenna units used for the uplink and downlink may be changed with respect to time to improve the likelihood of tag detection. In both methods of operation, the uplink and downlink UHF antenna signals may be combined using a circulator, directional coupler or Wilkinson splitter or similar, or a switch may be used so that only a single antenna per antenna unit is required. Alternatively, each antenna unit may be equipped with two antennas, one for transmitting and one for receiving signals.

In a case where the same modulation is to be applied to multiple antenna units in the downlink, the signals from a single baseband processing unit may be split within the central controller. A single cable may then be used to connect each antenna unit back to the controller. This topology has been termed a star and is shown in FIG. 1.

In an alternative embodiment, a single cable may connect a number of antenna units in a daisy chain arrangement with each antenna unit connected to the next as shown in FIG. 2. Within the antenna unit this arrangement can be supported by a simple tap of baseband signal, or by signal regeneration. The uplink signal in such an embodiment will be provided by only a single antenna unit, with this arrangement supported by a switch in the antenna units between the receiving antenna unit and the central controller being configured to pass the signal from the desired uplink antenna unit. A person skilled in the art will appreciate that this topology is not unique to the baseband signal transmission method, and that the signals could be transmitted at IF, or indeed UHF.

In yet a further embodiment, different modulation signals and frequencies may be applied to sub sets of the connected antenna units as shown in FIG. 9. FIG. 9 shows a daisy chained low IF system comprising multiple independent baseband processors (901, 902) in the central controller 903, each carrying at a different IF frequency set by the local oscillators IF A and IF B. The remote antenna units (904, 905) contain filterbanks (906, 907) for the selection of one of the IF signals for UHF transmission. For clarity the uplink and local oscillator reference signals have been omitted. In this case, where a daisy chain arrangement is used, the downlink signal transmission over the cable may be carried out at a low intermediate frequency such that multiple signals can be multiplexed on to the twisted pair having a spectrum as shown in FIG. 10. The antenna unit selects the desired component by filtering, which can be by means of a switched filter bank (906,907) or a super heterodyne process, before up conversion to the desired RF frequency. The same method may be used to allow uplink signals from multiple antenna units to be carried over a single cable. In this case they may use the same LO frequency where the RF frequency of each required uplink signal is different, or different LO frequencies may be used to support multiple uplink signals from antenna units sharing a common downlink frequency and potentially a common downlink modulation, where multiple uplinks signals are used for example to improve sensitivity or provide more advanced functions such as localisation.

In any embodiment described so far, the antenna unit may be configured to change the properties of the transmitted signal, for example, the frequency, the phase and, if connected to a controllable antenna, the polarisation and beam shape or direction. The antenna unit may perform these changes in response to direct commands from the central controller, or the antenna unit may monitor the downlink baseband signals and perform changes in response to particular events in the downlink protocol.

Where the antenna unit is configured to make a change to the phase of the transmitted signal, this may be performed by one or more of, a variable phase shifter after the quadrature modulator, by altering the phase of the local oscillator signal with respect to a reference signal, by altering the phase of the reference signal, by altering baseband IQ signals sent by the central controller, or by altering the phase of the IF signal sent by the central controller.

In a further embodiment, a single central controller may be connected to a large number of antenna units. The controller may select a sub-set of the connected antenna units to carry out an inventory. The reduced sub-set allowing a smaller interrogation field to be generated either for the purpose of reducing interference to surrounding areas or to achieve a higher resolution in the geographic location of the tags interrogated. Subsequent inventories may be carried out on other sub-sets of antenna units.

Where the central controller communicates to the antenna units at a low intermediate frequency, and antenna units may select the IF which is to be transmitted by means of a filter bank or superhetrodyne process, a single central controller may address multiple groups of antenna units to perform separate inventories simultaneously, with the uplink signals also carried back to the central unit also separated by their IF. This arrangement is shown in FIG. 9, only showing the downlink signal path and two antenna units for clarity. Multiple baseband units within the central controller allow the creation of independent interrogation signals. Using quadrature modulators these may be converted to different intermediate frequencies (IF A and IF B), again only two are shown for clarity but a system may have a larger number. A person skilled in the art will appreciate that the quadrature modulation and signal summation can be carried out in the analogue or digital domain. An example frequency spectrum of the output of the central controller is shown in FIG. 10. Turning back to FIG. 9, the downlink signal is carried to a number of antenna units connected in a daisy chain architecture with each antenna unit having a through signal path to the next, and tapping off some signal to transmit. Some embodiments may include amplification and regeneration in the through path. In this case each antenna units selects one of the intermediate frequency signal by means of a switched filter bank, although someone skilled in the art will appreciate that a tuneable filter or superhetrodyne arrangement can have the same effect. The selected signal is then mixed up to the desired UHF frequency for transmission. Although only two antenna units are shown for clarity, an implementation is likely to have a large number of antenna units with several configured to select and transmit signals A and B. A collection of antenna units configured to transmit the same signal at the same frequency may form a cell. The intermediate frequencies IF A and IF B may be chosen such that the desired UHF frequencies can be achieved using the same UHF local oscillator in antenna unit groups A and B, or they may be chosen subject to the requirement that different antenna unit groups should have different local oscillator frequencies. It can be desirable that RF A and RF B be different signals but occupy the same UHF frequency channel (allowing spatial frequency reuse). The uplink operates in a similar way in reverse. Again the same local oscillator in the antenna unit may be used to down convert the received signal to an intermediate frequency (such that the uplink IF is the same as the downlink IF) or different local oscillators may be used. Depending on the level of interference in other channels, filtering of the resulting IF may not be required. Where several antenna units are operating together as a cell (having the same RF carrier frequency and signal), it may be desirable to operate only one antenna unit as an uplink. In this case only the antenna unit operating as an uplink will be applied to the directional coupler to all the signal to the signal path. In other embodiments, it may be desirable to operate all the antenna units in a cell as independent, separable uplinks, for example to aid tag location. In this case each antenna unit may use a different uplink local oscillator such that each antenna unit has a different intermediate frequency allowing separate processing of the signals in the central controller.

Figure 11:
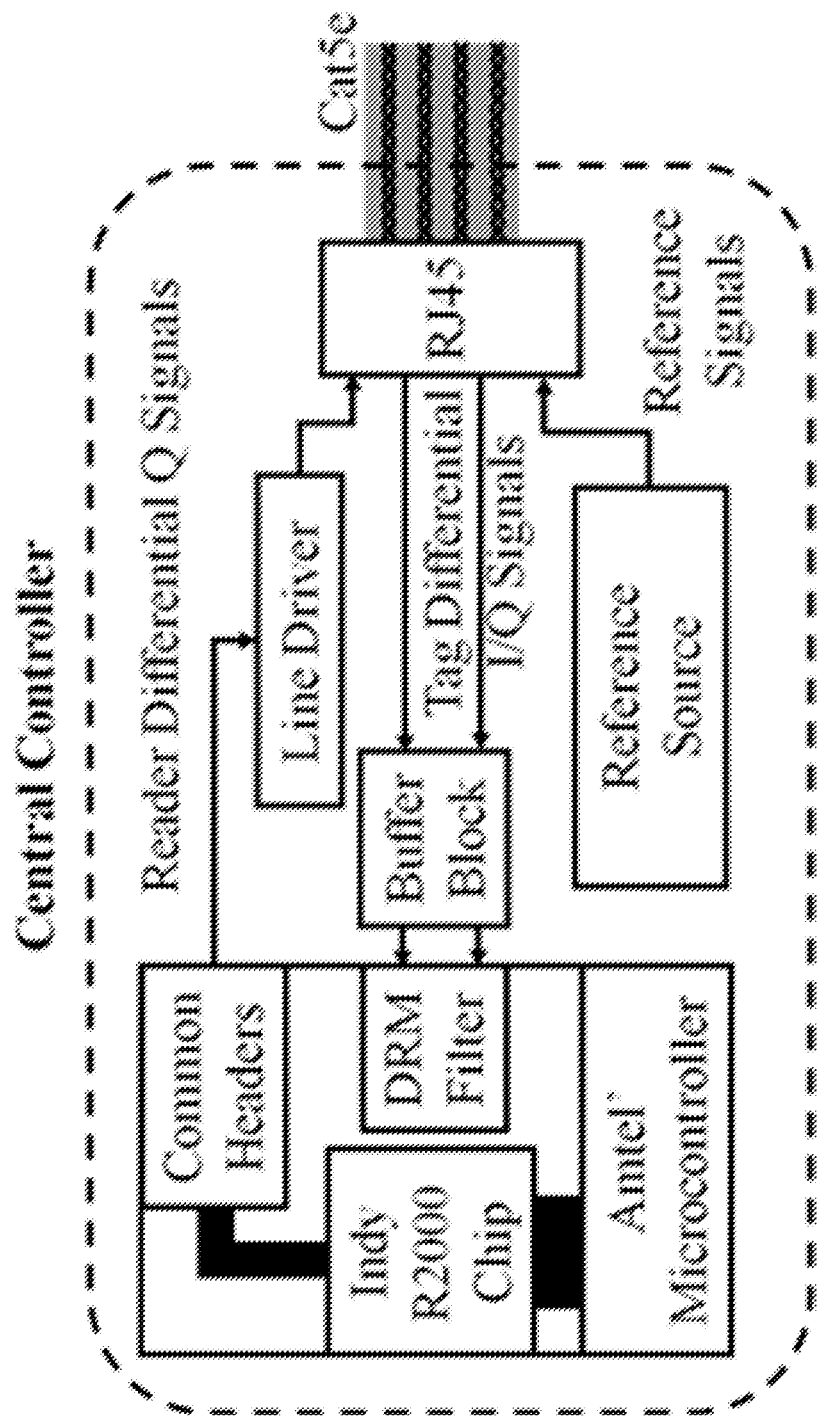
FIG. 11 shows an example of a central controller.

FIG. 11 shows an example of a design of central controller which may be deployed in the RFID system. The example design is based around the Impinj Indy R2000 chip which provides all of the baseband and RF functions to implement a reader based on the EPC global Gen 2/ISO 18000-6C standard (although in this implementation some of the functionality is unused). An Atmel AT91SAM7S256-MU is used as a system microcontroller to implement the EPC Class 1 Gen 2 protocol and provide an interface for external control. The baseband transmit signal can be accessed from the analog test pins of the R2000 as a differential signal. However, since these baseband signals are directly connected to the internal analog bus, they have little current driving capability. A line driver is therefore designed to amplify these analog signals without loading the signal bus. Due to the ASK modulation in the downlink, the data on the I channel is set to null (0) and signals only exist on the Q channel. In this way, only a single twisted pair is used to transmit the downlink signals.

In respect of the uplink, an analog buffer block in the central controller is employed to buffer the received baseband signals and provide noise filtering. After this block, the analog tag signals are fed into the R2000 chip for additional filtering and processing via the inputs designed for the external dense reader mode (DRM) filters, thus allowing bypassing of the RF to IF conversion stages on the IC. The reference source block allows future frequency and phase hopping of the local oscillator in the antenna subsystem by varying the phase and frequency of the reference signal. Thus, a 10 MHz signal is generated as an external reference source in this block for the frequency synthesizer in the antenna subsystem.

Figure 12:
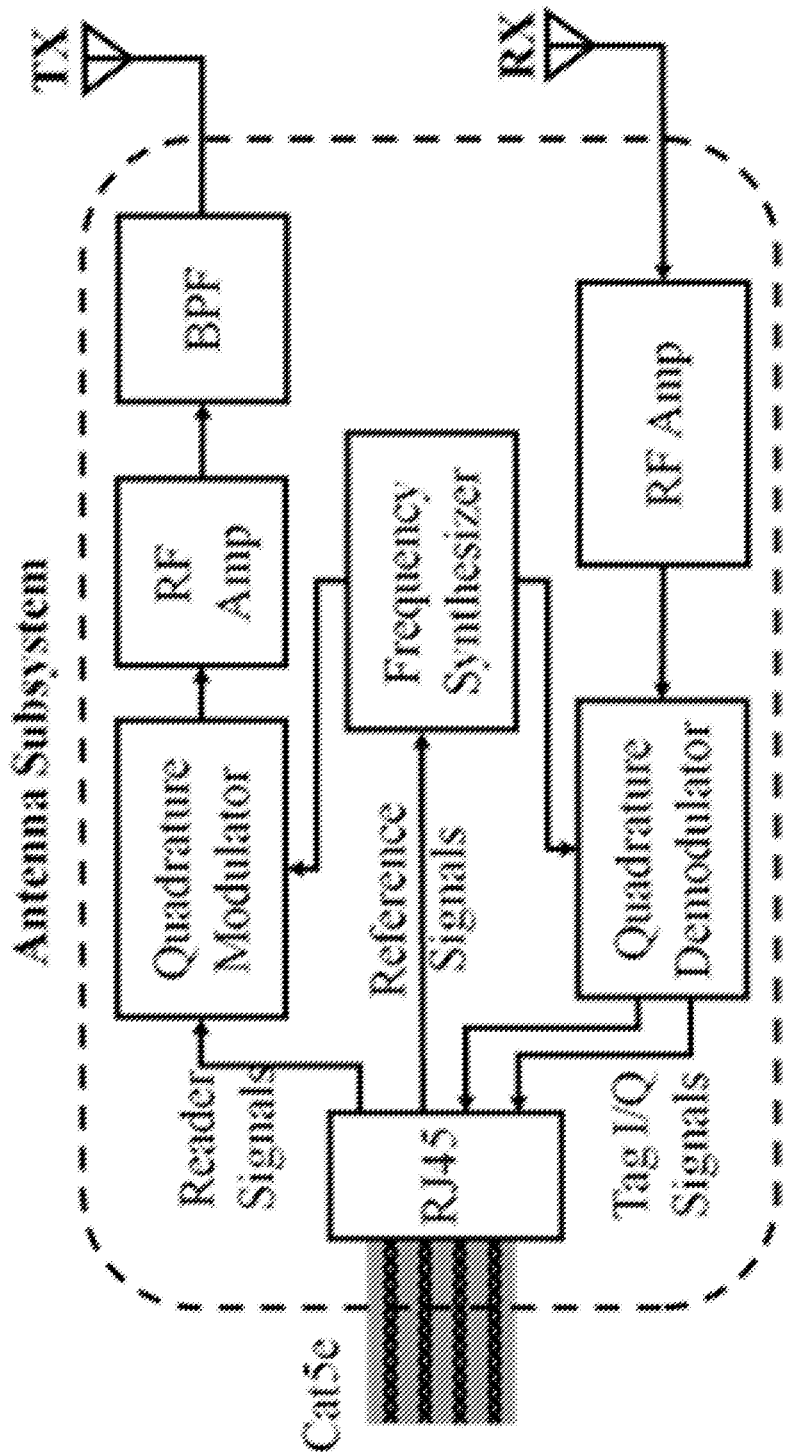
FIG. 12 shows an example of an antenna subsystem.

FIG. 12 shows an example of antenna subsystem which may be deployed in the RFID system and is mainly composed of quadrature modulator and demodulator, RF power amplifiers, and a PLL-based frequency synthesizer. The AD8349 quadrature modulator and the ADL5380 quadrature demodulator are used to fulfil up- and down-conversion tasks. The carrier frequency is generated by a fractional-N/integer-N PLL-based frequency synthesizer ADF4350, which can work with its internal oscillator with or without external reference signals, but in this implementation, an external 10 MHz reference signal from the central controller is applied. Two RF amplifiers (RF5110G) are adopted for providing sufficient gain for the signals both in the downlink and uplink. The output power of this amplifier can be controlled from −10 dBm to +35 dBm by changing the voltage level of power control (Vapc).

Figure 13:
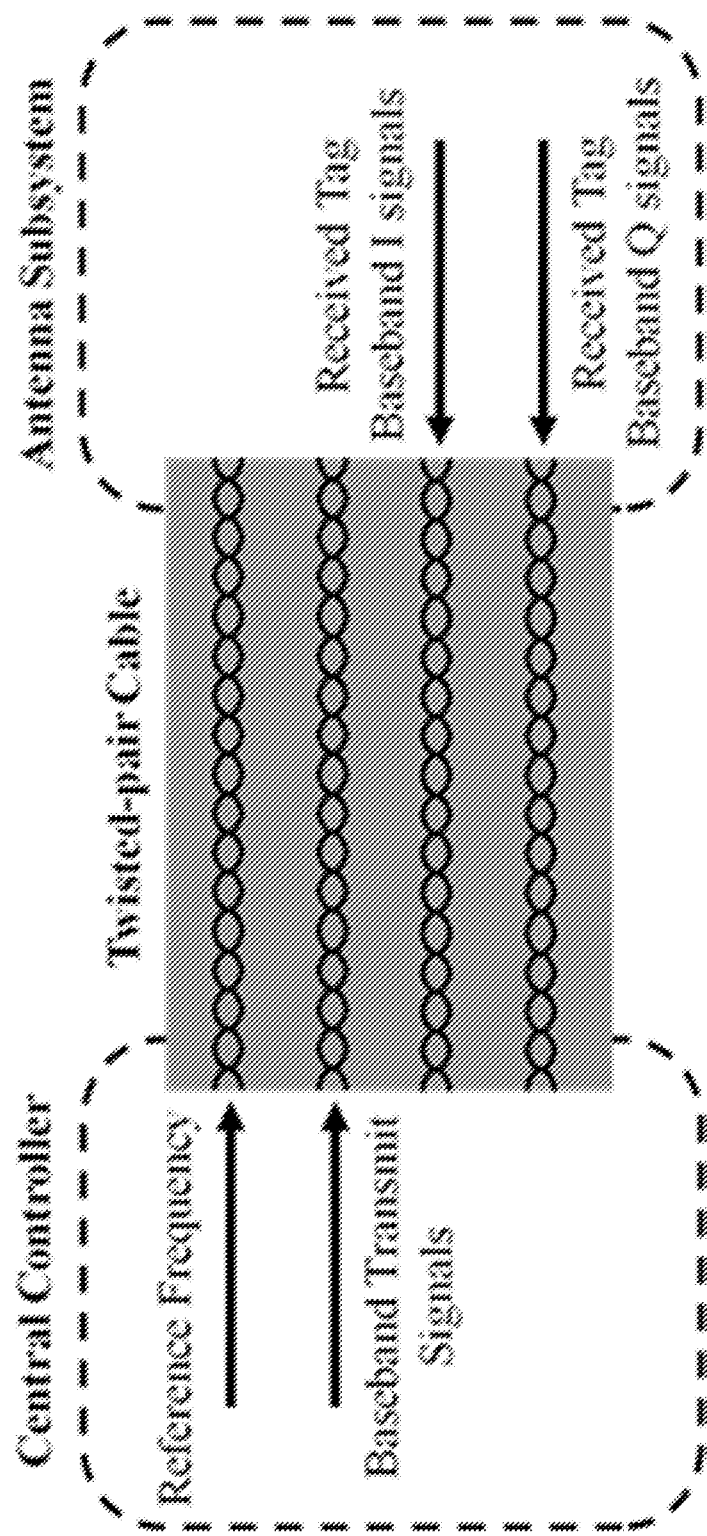
FIG. 13 shows a schematic of a system using a central controller and an antenna subsystem.

In one example, Category-5 cable is used for building RFID system. This cable has bandwidth of 100 MHz and is relatively cheap compared to other higher-bandwidth twisted-pair cables. There are four pairs of wires in one Cat5 cable as shown in FIG. 13 and all pairs of wires are used in the system; one for transmitting the baseband reader signals, one for the synthesizer reference frequency from reader controller and two for receiving in-phase and quadrature down-converted tag signals from the antenna subsystem. Alternatively, it would be possible to transmit the DC power for the antenna subsystem over the pairs in a manner similar to power over Ethernet (PoE). Since these Ethernet cables have same wiring scheme, other types of twisted-pair cable such as Cat5e, Cat6 may also be applied for the controller-subsystem connection.

In addition to the attenuation benefits of the Cat5 scheme, it is lower cost and easier to install than LMR-400 and LMR-1700 co-axial cables commonly used for RFID applications, due to the narrower diameter and smaller minimum bend radius.

In order to evaluate the RFID system performance, a RFID Tester TC-2600A was employed; this tester can emulate a reference tag for measuring reader performance. For sensitivity measurement the RFID Tester can calculate the reader's bit error rate (BER) and frame error rate (FER) by comparing its sent RN16 signal while emulating a tag with the RN16 included in ACK signal from the reader. The sensitivity of the system can then be captured by determining the minimum backscattered power of remaining the desired BER or FER.

Figure 14:
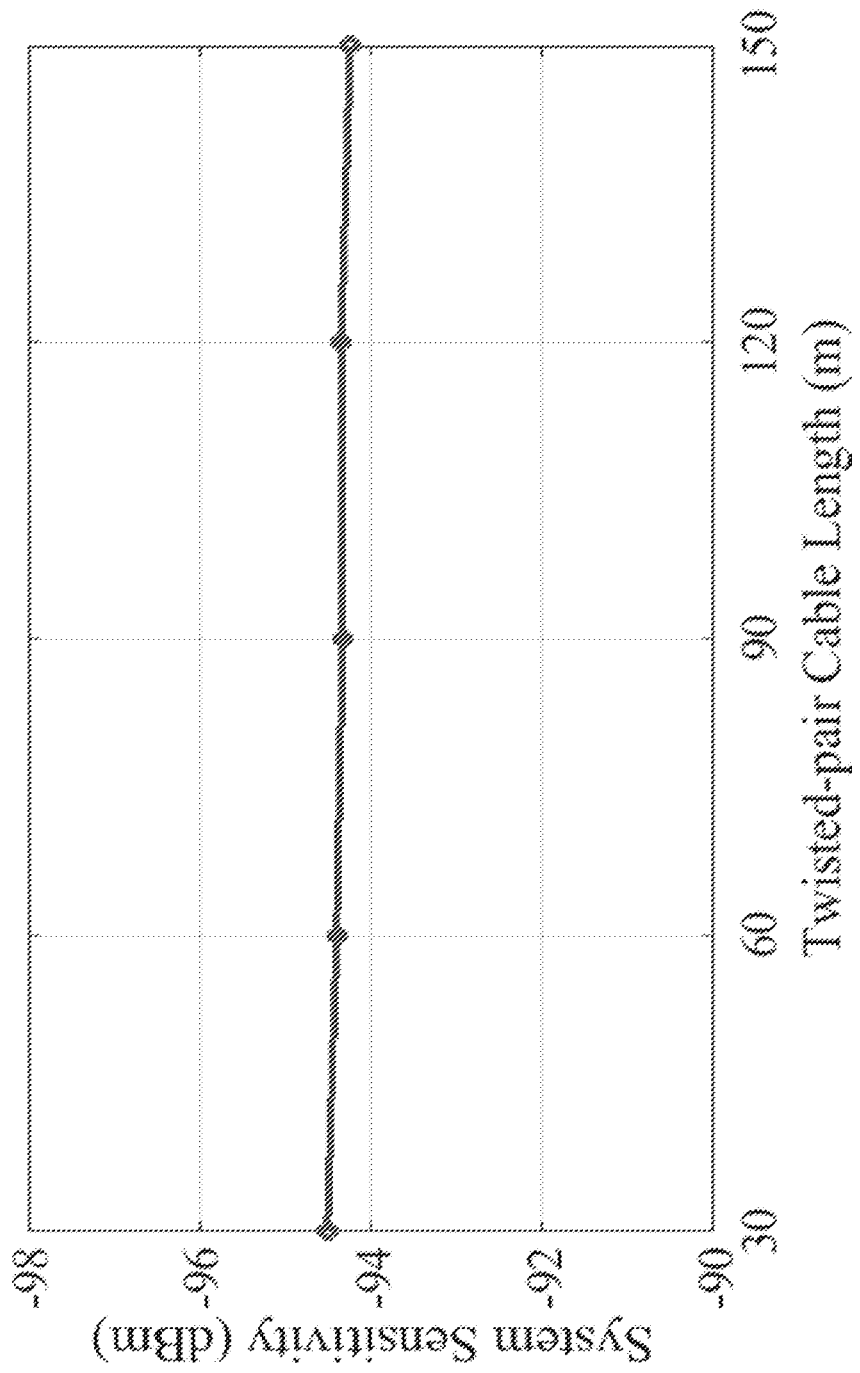
FIG. 14 shows performance a RFID interrogator system over different cable lengths.

A series of tests were conducted to measure the system sensitivity with various lengths of Cat5 cable. In these tests, the Miller-2 PR-ASK transmit mode is applied and a 10 MHz reference signal with a power of 10 dBm is transmitted from the central controller over the Cat5 cable. Due to the maximum input power limits of the RFID Tester, the output power of the antenna subsystem is +16.4 dBm at a carrier frequency of 867.4 MHz. The threshold of FER for determining the sensitivity is set at 45%. The system sensitivity for each cable length has been measured 10 times, and the average sensitivity value is shown in FIG. 14. It is shown that the best sensitivity result of this system is −94.5 dBm when 30 m Cat5 cable is used to connect its controller and subsystem. After increasing the length of Cat5 cable to 150 m, the sensitivity reduces slightly to −94.2 dBm. As a result, the system sensitivity is initially independent of cable length up to 150 m.

In order to investigate the dependence of sensitivity on the cable attenuation, the attenuation of backscattered signal in the Ethernet cable has been measured (although for experimental reasons, this has been emulated using a function generator at 350 kHz). The results are summarized in the Table below alongside the losses of common coax cables derived from their specifications. It can be seen that the tag signal suffers from 0.3 dB attenuation over 30 m and 1.6 dB over 150 m Cat5 cable respectively. The attenuation difference between these two lengths is around 1.3 dB, which is significantly larger than the sensitivity reduction.

| Cable Type | | Cat5 Cable | LMR-400 Coaxial Cable | LMR-1700 Coaxial Cable |
| --- | --- | --- | --- | --- |
| Frequency | | 350 kHz | 900 MHz | 900 MHz |
| Cable | 30 m | 0.32 | 3.84 | 0.93 |
| Loss (dB) | 90 m | 0.96 | 11.52 | 2.79 |
| | 150 m | 1.60 | 19.2 | 4.65 |

Additionally, a practical demonstration of the detection range of a 300 m Cat5 connected RFID system has been carried out. Two 8.5 dBic circularly polarized antennas are connected to antenna subsystem in a bistatic configuration using two 2 m coaxial cables, and they are deployed in height of 1.5 m. An UPM Raflatac DogBone tag can be successfully detected at same height but 6 m away from the antennas with a transmission power of 31.9 dBm EIRP. Here the transmission distance is limited by the space available and is not an upper limit, but shows the potential for long range tag reading over a Cat5 cable equal in length to over 3 times the limit for standard Ethernet.

A cost-effective UHF RFID system using low cost Cat5 Ethernet cable to address remote antennas has been described. The reader sensitivity of this system can achieve −94.5 dBm over 30 m cable, and its sensitivity can still remain at around −94.2 dBm with 150 m Cat5. The passive tags can be successfully detected over a 6 m wireless range following 300 m of twisted pair between the central controller and antenna.

One problem in UHF RFID systems can be the desensitisation of an uplink due to a self-jammer effect resulting in downlink signals leaking into the uplink. The high power downlink signals entering into the uplink chain may cause saturation of the amplifiers, saturation of the mixers, or saturation of the analog to digital converters. In the case of a direct conversion receiver any residual leakage can be manifest as a DC offset on a mixer output. The effects may be mitigated by a variety of self-jammer cancellation (leakage cancellation) techniques. Cancellation may be carried out as close to the antenna as possible to reduce the risk of saturation.

A self-jammer cancellation technique is described here. This technique involves taking a copy of the downlink signal from the downlink RF chain and adjusting the amplitude and phase such that it is equal in amplitude but 180 degrees output of phase relative to a leakage signal entering the uplink. Summing the adjusted downlink signal and leakage signal results in leakage cancellation. A control loop may be used to track changes in the leaked signal and achieve high cancellation of the order of 30-40 dB.

Figure 15:
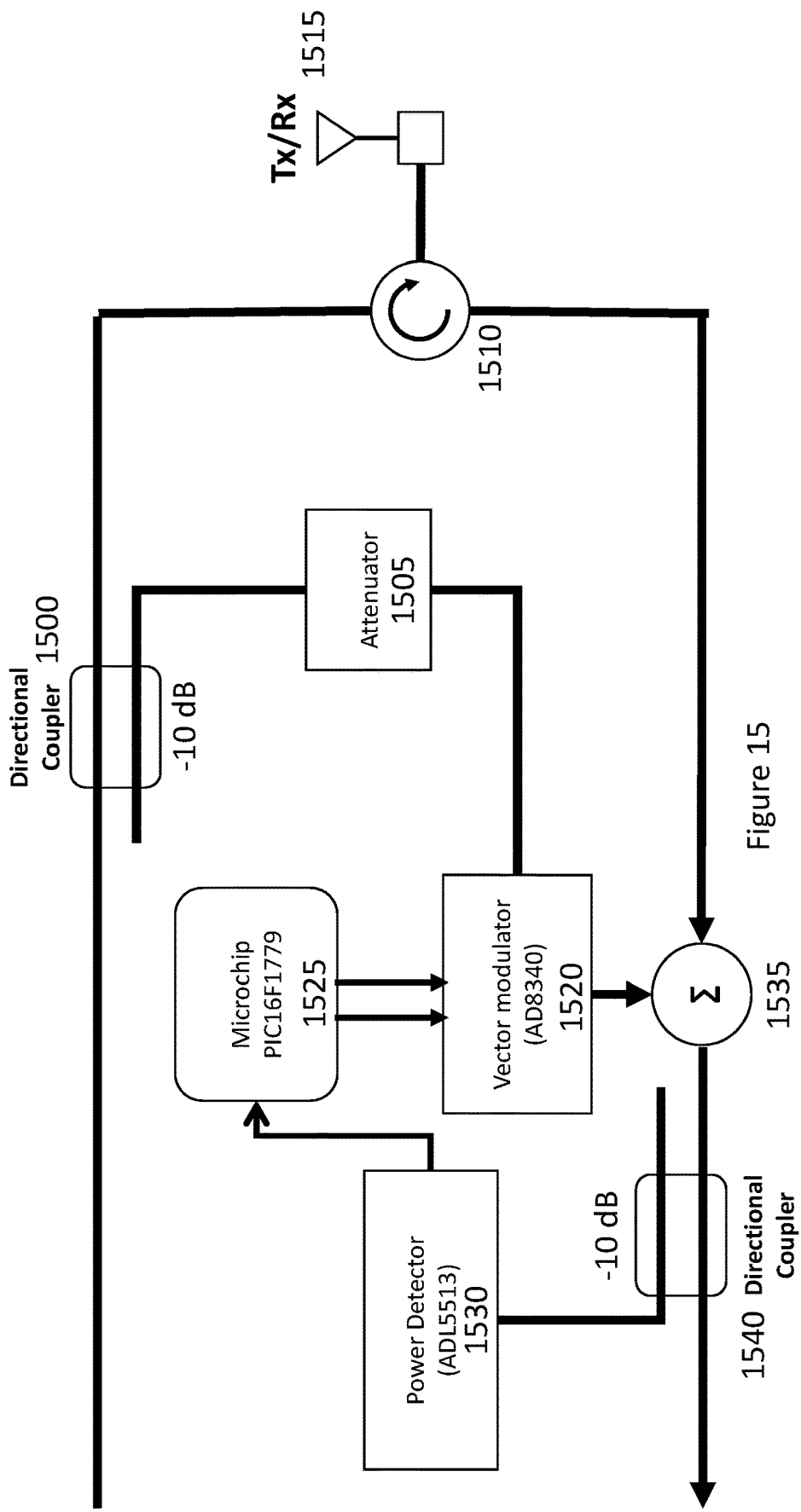
FIG. 15 shows an example of configuration of a leakage cancellation unit.

FIG. 15 shows an example of such a leakage cancellation unit. A tap such as directional coupler 1500 taps a signal from the downlink signal before it is provided to a circulator 1510 and transmit/receive antenna 1515. This tapped downlink signal is then attenuated by attenuator 1505 and applied to a vector modulator 1520 where an amplitude and phase of the signal may be adjusted. This adjusted signal is summed at 1535 with the uplink signal, for example from antenna 1515 and circulator 1510. A controller 1525 (e.g. a PIC16F1779) is programmed to use a power detector 1530 to detect power in the uplink via a tap such as directional coupler 1540, located after the signals are summed as part of a closed loop control system. In this example, the transmit and receive functions are performed by the same antenna making use of a circulator. However in other examples separate Tx/Rx antennas could be used; and/or separate antenna units could be used for the transmit and receive functions.

Figure 16:
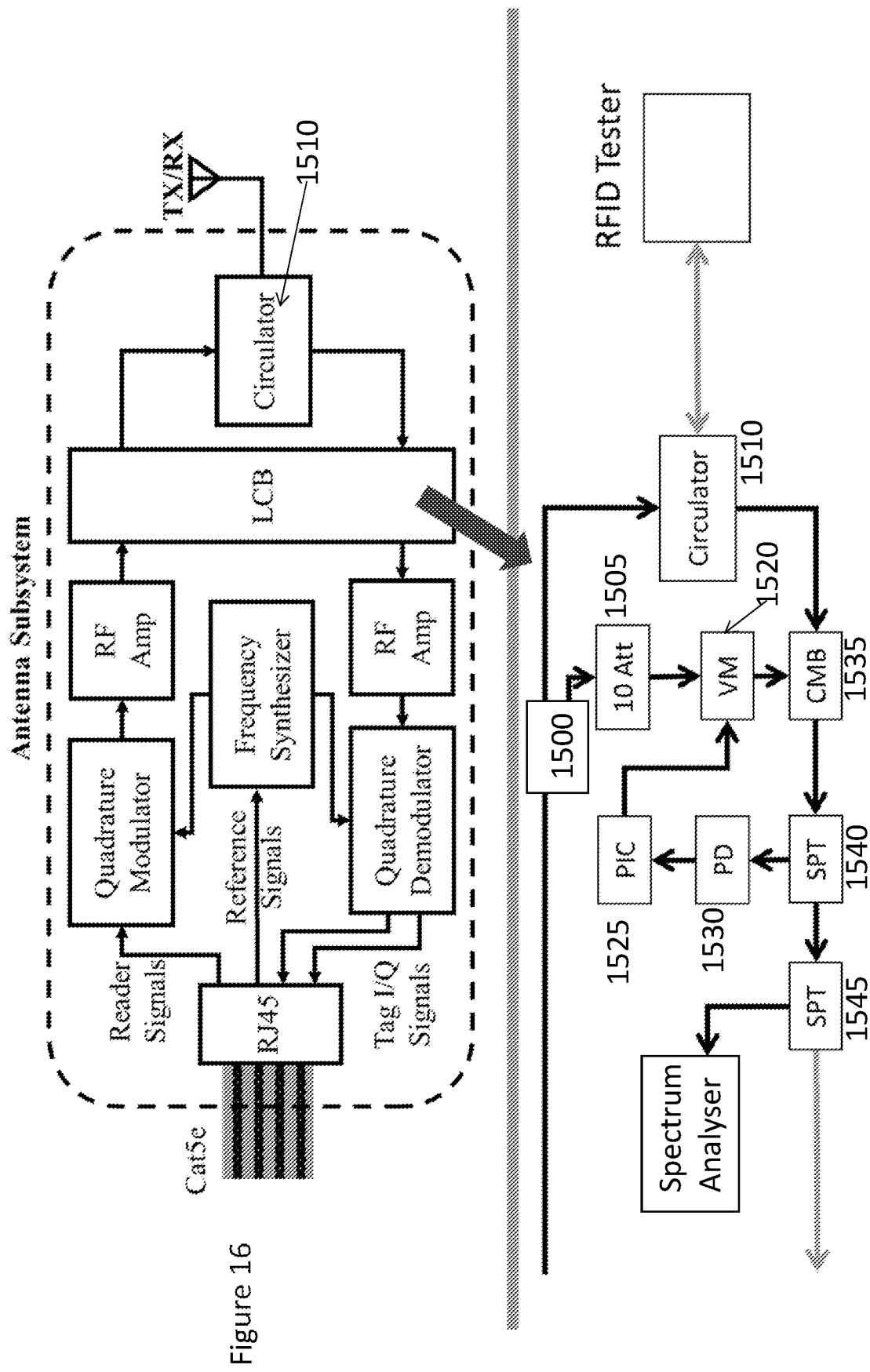
FIG. 16 shows an antenna subsystem of FIG. 12 comprising a leakage cancellation unit of FIG. 15.

FIG. 16 illustrates location of the leakage cancellation unit within an antenna unit. In FIG. 16 like elements to those of FIG. 15 are indicated by like reference numerals.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A system for the distribution of RFID signals to a remote antenna or a remote antenna network comprising:
    a central control module to generate signals and control the protocol operations of the system; and
    a cable connecting the central module to one or more antenna subsystems carrying IF or substantially baseband representations of reader to tag modulation and tag to reader modulation, wherein a timing reference signal is transmitted over a pair of the cable, to one or more antenna subsystems to phase lock frequency conversion oscillators of the system.

2. A system according to claim 1 wherein an antenna subsystem performs up-conversion to RF in a downlink and down-conversion from RF to base-band in an uplink.

3. A system according to claim 1, whereby the antenna subsystem is powered using DC signals applied to the cable.

4. A system according to claim 1 comprising one or more antenna subsystems, wherein a separate cable is used between the central module and each antenna subsystem.

5. A system according to claim 1 comprising one or more antenna subsystems, wherein a separate cable is used between the central module and each antenna subsystem, and/or wherein multiple antenna subsystems are daisy-chained from a single cable from the central control module, to link the central control module to the antennas.

6. A system according to claim 1 where the cable is twisted pair cable.

7. A system for the distribution of RFID signals to a remote antenna or a remote antenna network comprising:
a central control module to generate signals and control the protocol operations of the system; and
a cable connecting the central module to one or more antenna subsystems carrying IF or substantially base-band representations of reader to tag modulation and tag to reader modulation,
wherein a reference signal is transmitted over the cable to maintain coherence between local oscillators of two or more antenna sub-systems of the system.

8. A system for the distribution of RFID signals to a remote antenna or a remote antenna network comprising:
a central control module to generate signals and control the protocol operations of the system;
a cable connecting the central module to one or more antenna subsystems carrying IF or substantially base-band representations of reader to tag modulation and tag to reader modulation; and
multiple antenna units,
wherein multiple antenna subsystems are daisy-chained from a single cable from the central control module,
wherein the cable connecting the central module to one or more antenna subsystems carries IF representations of reader to tag modulation and tag to reader modulation, and
wherein multiple signals having different IF signals are carried on the cable for the multiple antenna units such that each antenna unit is configurable to select one of the IF signals for transmission by means of a configurable filter.

9. The system according to claim 8, wherein the configurable filter comprises a switched filter bank.

10. The system according to claim 9, wherein the configurable filter is configured to implement a superheterodyne process.

11. A system for the distribution of RFID signals to a remote antenna or a remote antenna network comprising:
a central control module to generate signals and control the protocol operations of the system; and
a cable connecting the central module to one or more antenna subsystems carrying IF or substantially base-band representations of reader to tag modulation and tag to reader modulation,
wherein the uplink (tag to reader) signals are carried at an IF frequency, with different antenna subsystems utilizing different IF frequencies to allow separation of the signals from each antenna subsystem at the central controller.

12. A system for the distribution of RFID signals to a remote antenna or a remote antenna network comprising:
a central control module to generate signals and control the protocol operations of the system;
a cable connecting the central module to one or more antenna subsystems carrying IF or substantially base-band representations of reader to tag modulation and tag to reader modulation, wherein the cable connecting the central module to one or more antenna subsystems carries IF representations of reader to tag modulation and tag to reader modulation; and
one or more antenna subsystems,
wherein the separation of the IF frequencies in the system is such that their separation is equal to the RF channel spacing, and
wherein a common RF local oscillator frequency is used by multiple antenna units such that channel hopping may be achieved by switching of an IF selection filter in the antenna subsystems.

13. A system for the distribution of RFID signals to a remote antenna or a remote antenna network comprising:
a central control module to generate signals and control the protocol operations of the system;
a cable connecting the central module to one or more antenna subsystems carrying IF or substantially base-band representations of reader to tag modulation and tag to reader modulation; and
one or more antenna subsystems, configured to control the antenna subsystems through demodulation of the downlink signal to allow synchronization of the antenna subsystem configuration and a downlink protocol.

14. A system for the distribution of RFID signals to a remote antenna or a remote antenna network comprising:
a central control module to generate signals and control the protocol operations of the system;
a cable connecting the central module to one or more antenna subsystems carrying IF or substantially base-band representations of reader to tag modulation and tag to reader modulation, wherein the cable connecting the central module to one or more antenna subsystems carries IF representations of reader to tag modulation and tag to reader modulation; and
multiple antenna units,
wherein multiple signals having different IF signals are carried on the cable for multiple antenna units such that each antenna unit is configurable to select one of the IF signals for transmission by means of a configurable filter, and
wherein the system is configured such that multiple antenna subsystems simultaneously select the same IF frequency to form a cell transmitting substantially the same signal over an interrogation area.

15. The system according to claim 14, wherein the system is configured to change the antenna of at least some of the antenna subsystems on a particular IF frequency with respect to time to alter the physical location of the cell or interrogation area.

16. A system for the distribution of RFID signals to a remote antenna or a remote antenna network comprising:
a central control module to generate signals and control the protocol operations of the system; and a cable connecting the central module to one or more antenna subsystems carrying IF or substantially baseband representations of reader to tag modulation and tag to reader modulation, wherein the system is configured to provide a portion of a signal to a transmit antenna to a signal processing path of a signal from a receive antenna of the system to cancel signal leakage from the signal to the transmit antenna.

17. The system according to claim 16 further comprising separate antenna units to process the signal to the transmit antenna and the signal from the receive antenna.

* * * * *